Jan. 12, 1932.  E. A. JOHNSTON ET AL  1,840,585
HARVESTER THRASHER
Filed Aug. 5, 1929  2 Sheets-Sheet 2
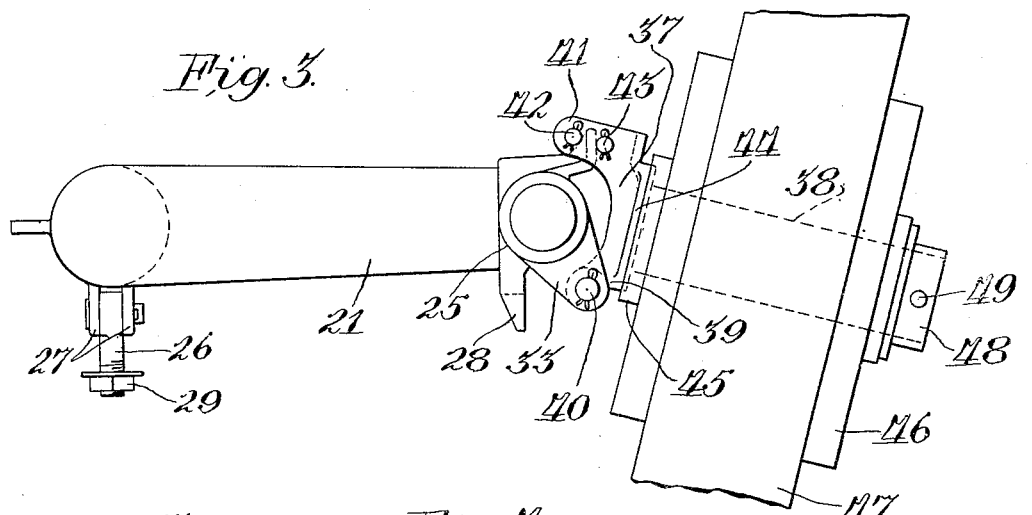
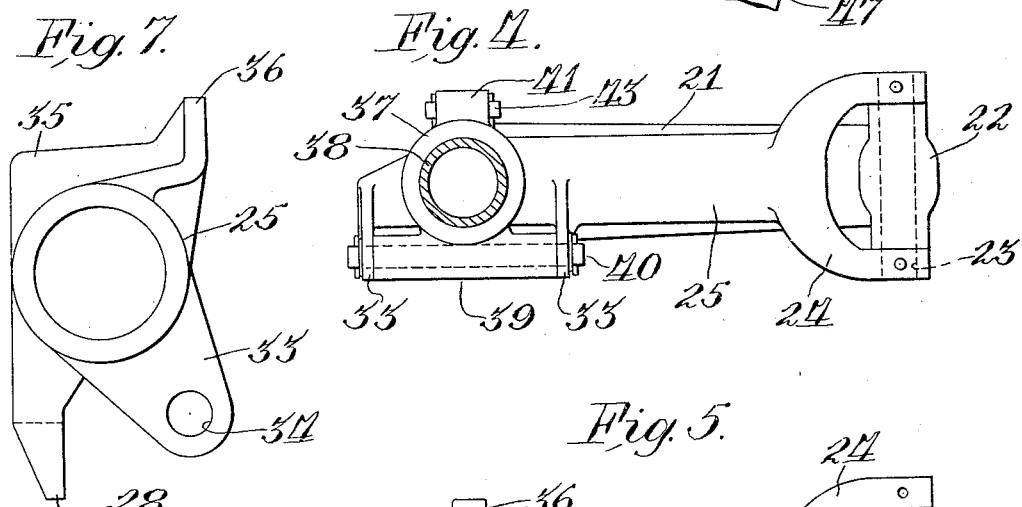
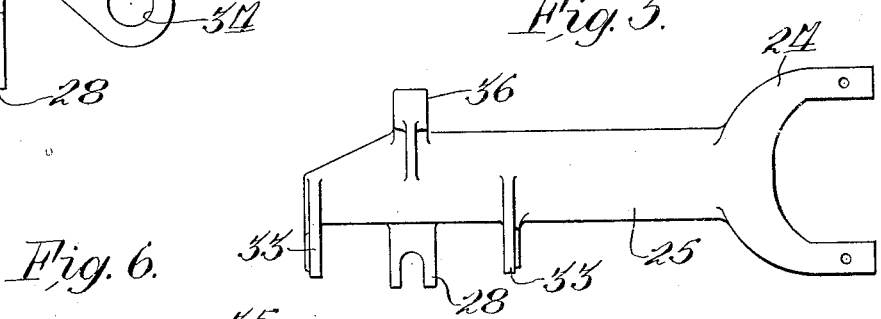
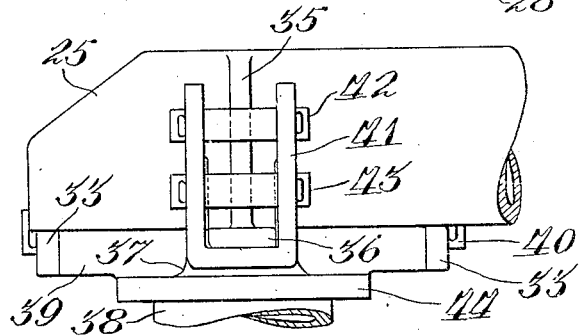
Inventors
Edward A. Johnston
and Clemma R. Raney
By
Atty.

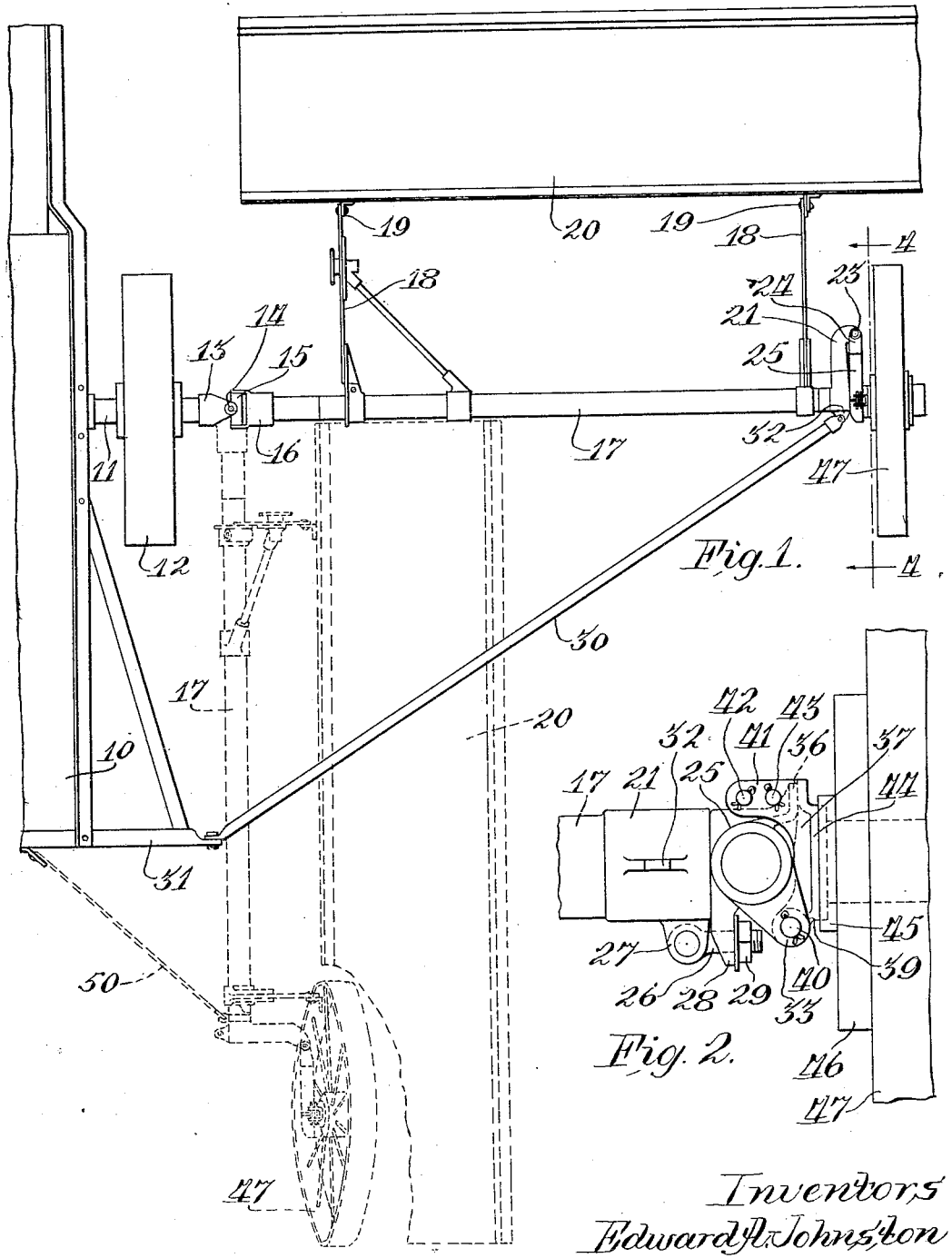

Patented Jan. 12, 1932

1,840,585

UNITED STATES PATENT OFFICE

EDWARD A. JOHNSTON, OF CHICAGO, AND CLEMMA R. RANEY, OF RIVERSIDE, ILLINOIS, ASSIGNORS TO INTERNATIONAL HARVESTER COMPANY, A CORPORATION OF NEW JERSEY

HARVESTER THRASHER

Application filed August 5, 1929. Serial No. 383,543.

The invention relates to harvester thrashers of the folding type.

Particularly, the invention is an improved wheel structure for supporting the free end of the harvester part of such a machine, said structure including a wheel which is capable of performing the dual function of a grain wheel during cutting, and of a trailing, castering wheel when transporting the machine with the harvester part folded, said wheel always remaining connected to the harvester support.

The objects of the invention are to provide a simplified, compact combination grain and caster wheel structure for a folding type of harvester thrasher; to provide such structure in which the change from cutting to trailing position will be easy of accomplishment without the need of any special tools; and, lastly, generally to improve such structures for the purpose of facilitating the folding operation of a harvester thrasher.

The harvester thrasher comprises a thrasher part with a normal, transversely extended harvester axle or support hingedly connected to the thrasher part for rearward folding movement relative thereto, in a horizontal plane. Briefly, the above objects are accomplished in such a combination by mounting at the grainward end of the harvester support or axle, a simple, compact structure to which is connected a wheel for carrying the free end of said harvester support, said structure including latch means for holding the wheel against castering when cutting, and which may be released to permit castering of the wheel, when the harvester part has been folded. The structure also includes means to enable the wheel to be tilted to a position where it will best function as a trailing caster wheel, all as will later more fully appear.

In the drawings, wherein a practicable form of the invention has been chosen by way of example;
Figure 1 is a general plan view of a harvester thrasher, showing the harvester part in normal cutting position in full lines, and in the folded transport position in the dotted lines;
Figure 2 is a rear elevational view, showing the structure of this invention when the wheel is in normal position;

Figure 3 is a similar view, but showing the wheel in its trailing, castering position;

Figure 4 is a side, sectional view, as seen along the line 4—4 appearing in Figure 1;

Figure 5 is a side view of a bracket;

Figure 6 is a plan view of a part of the structure shown in Figure 4; and,

Figure 7 is an elevational view of the part shown in Figure 5, as viewed from the left in the drawings.

The harvester thrasher comprises a thrasher part 10 carried on an axle 11 journaled in a pair of wheels, one of which is shown at 12. The projected end of said axle carries a cap piece 13 embodying a vertical hinge pin 14 to which is connected a horizontal hinge pin 15 formed as a part of another cap piece 16 made fast to a harvester support or axle 17, which normally projects transversely in the cutting operation, as appears from the full line showing in Figure 1.

Line levers 18 are connected to support 17 for pivotal movement upwardly about the axis of said support. The levers then pivotally carry, by means of pivotal connections 19, the harvester platform 20. Of course, the usual counter-balance and adjusting mechanisms must be employed to hold the platform in position. Such mechanisms have not been shown, as they form no part of this invention.

The grainward end of the support 17 carries a forwardly extending bracket 21, which includes at its forward end, a grainwardly curved extension formed with a vertically disposed sleeve 22. This sleeve serves as a journal for a hinge pin 23 to which is pinned the yoke 24 of an arm 25. Normally, the hinge 23 is inoperative, because the bracket 21 and arm 25 are latched together in the position shown in full lines in Figure 1, wherein said parts lie folded together in substantial parallelism. The latching mechanism comprises a bolt 26 hinged between ears 27 depending from the underside of the rear end of the bracket 21. The bolt may be swung up, as shown in Figure 2, to engage between the parts of a depending fork 28 formed at the rear end of the arm 25. A nut 29 fits the threaded end of the bolt 26 to lock the bracket and arm together.

A diagonal brace 30 for the support 17 connects between a thrasher frame extension 31 and an eye 32 formed at the rear end of the bracket 21 (see Figure 1). This brace is removable.

As shown best in Figures 5, 6 and 7, the arm 25 is formed with a pair of depending arms 33, spaced apart and having eyes 34. Also, said arm has formed on its top, a ridge 35 terminating in an upstanding boss 36 for a purpose presently to appear. A wheel spindle bracket 37 is next provided, which includes a spindle 38 and a sleeve 39 at its bottom, which is designed to fit between the arms 33 so that a hinge pin 40 may be used pivotally to connect said spindle bracket to the eyes 34 in the arms 33 formed on the arm 25. A V-shaped extension 41 is formed on top of the spindle bracket 37, through which are arranged two removable pins 42 and 43, the extension straddling the ridge 35 and boss 36, as shown best in Figure 6.

The spindle bracket includes a circular part 44 which fits into the circular part 45 of a hub 46, upon which the wheel 47 is mounted in any approved manner. A cap 48 and pin 49 hold the hub on the spindle 38, (see Figure 3). The mode of use and operation of the structure of the invention will next be described.

It is desired to narrow the overall width of the harvester thrasher so as to make possible transport of the machine over roads and through narrow places. The normal position of the parts is shown in full lines in Figure 1 and in Figures 2 and 6. It is necessary to fold the harvester part back to the dotted line showing in Figure 1. The first step in the operation is to withdraw the pin 43 from the extension 41. With the pin removed, it is now possible to tilt the wheel 47 about its horizontal hinge 40 until the boss 36 is contacted by the other pin 42, as shown best in Figure 3. Next, the nut 29 is removed to release the latch bolt 26 from the fork 28, which frees the arm 25 for hinging movement about the vertical hinge pin 23, thus permitting the wheel freedom of movement for castering. Next, the diagonal brace 30 is removed. The support 17 is now free for swinging movement about the vertical hinge pin 14 to permit of folding the same, with the harvester platform, through a horizontal plane to the dotted line position of the parts appearing in Figure 1. The platform may be of the type having an additional clearance movement in which the same is raised to a position above the wheel 47, as appears in dotted lines in Figure 1. A tie-rod 50 is employed to hold the support in a longitudinal position, as shown. The machine is now ready for transport. If, after transport, it is desired to return the harvester part to normal position for cutting, the steps just enumerated will obviously be reversed.

From this disclosure, it must now be appreciated that an improved, combined grain and caster wheel has been provided for carrying a foldable harvester support, which wheel remains at all times connected to the support, and which may be converted from a fixed wheel to a tilted castering wheel without the aid of any special tools. The structure, obviously, also is simple, compact, and foolproof, thereby achieving all of the desirable objects heretofore recited.

It is the intention to cover all such immaterial alterations of the illustrative embodiment herein chosen for purposes of illustration as do not depart from the spirit and scope of the invention as depicted by the definitions thereof embodied in the claims to follow.

What is claimed is:

1. In a machine of the class described, a thrasher part, a normally transversely extended support hingedly connected to the thrasher for folding movement relative thereto, a wheel carrying the outer end of the support, and a coupling for mounting the wheel on the support to enable it to function as a grain wheel in the normal position of the support, said coupling including means whereby the wheel may be tilted when the support is folded to serve as a transport wheel.

2. In combination, a support, a bracket carried thereby, an arm hingedly connected to the bracket, means for locking the arm to the bracket to make the hinge inactive, a bracket including a spindle hingedly connected to the arm, a wheel on the spindle to carry the support, and means to lock the second mentioned hinge in inoperative position.

3. In a machine of the class described, a thrasher part, a normally transversely extended support hingedly connected to the thrasher for folding movement relative thereto, a bracket carried by and extending forwardly of the support, an arm hingedly connected to the free end of said bracket, a releasable connection for locking the arm to the bracket, a spindle bracket hingedly connected to the arm, means for making said hinge inoperative, and a wheel journaled on the spindle bracket.

4. In combination, a support, a bracket carried thereby, an arm hingedly connected to the bracket, a releasable latch for holding said parts together, a bracket connected to the arm and including a spindle normally coaxial with the support, said bracket connection embodying a releasable hinge to permit of tilting the spindle relative to the support, and a wheel journaled on said spindle for carrying the support.

5. In a machine of the class described, a thrasher part, a harvester part foldingly connected thereto, a wheel for carrying the outer end of the harvester part, a coupling for connecting the wheel to the harvester part to enable the wheel to function as a fixed grain wheel when the harvester part is in normal position, and means included in the coupling to enable the wheel to function as a trailing, tilted, castering wheel when the harvester part is in folded position.

6. In combination, a support, a bracket carried by the support, an arm pivotally connected to the bracket, a wheel spindle carried by the arm, a wheel journaled on the spindle, said arm adapted to lie alongside the bracket whereby the spindle axis is normally disposed coaxially of the axis of the support, said arm with the wheel and spindle adapted to be swung about its pivot to cause the wheel to run in a lengthwise direction relative to the axis of said support, and means to set the wheel and its spindle in a tilted position to cause the wheel to turn in a plane at an angle to the vertical.

7. In combination, a support, a bracket carried by the support, an arm pivotally connected to the bracket, a wheel spindle carried by the arm, a wheel journaled on the spindle, said arm adapted to lie alongside the bracket whereby the spindle axis is normally disposed coaxially of the axis of the support, said arm with the wheel and spindle adapted to be swung about its pivot to cause the wheel to run in a lengthwise direction relative to the axis of said support, a hinge whereby the spindle may be dropped to an inclined position to tilt the wheel in a plane at an angle to the vertical, and means to hold the spindle fixed for causing the wheel to turn in such tilted position.

8. In a machine of the class described, a thrasher part, a normally transversely extended horizontal support hingedly connected at its inner end to the thrasher for folding movement relative thereto, a bracket carried at the outer end of said support, a swing arm connected to the bracket by a vertical pivot, a spindle connected to said arm by a horizontal pivot whereby to tilt the spindle, a wheel journaled on the spindle, and means to lock the horizontal pivot to make the same inactive whereby said wheel may operate in either a vertical plane or in a plane at an angle to the vertical.

9. In a machine of the class described, a thrasher part, a normally tranversely extended horizontal support hingedly connected at its inner end to the thrasher for folding movement relative thereto, a forwardly extending bracket carried at the outer end of said support, a swing arm connected to the forward end of the bracket by a vertical pivot pin, a releasable latch for latching the swing arm alongside the bracket, a spindle, a wheel carried by the spindle, a horizontal pivot pin for connecting the spindle to the swing arm, and means whereby the spindle may be held in a position coaxial with the support or be tilted at an angle with respect thereto.

10. In combination, a support, a coupling carried by the support embodying an arm carrying a spindle, a wheel journaled on the spindle to carry the support, and a pair of hinges whereby the arm may pivot with the wheel and spindle relative to the support and whereby the wheel may be tilted with its spindle relative to the arm.

11. In combination, a support, a coupling carried by the support embodying an arm carrying a spindle, a wheel journaled on the spindle to carry the support, and a pair of hinges having axes disposed at right angles to each other whereby the arm may pivot with the wheel and spindle relative to the support and whereby the wheel may be tilted with its spindle relative to the arm.

In testimony whereof we affix our signatures.

EDWARD A. JOHNSTON.
CLEMMA R. RANEY.